(12) United States Patent
Dechery et al.

(10) Patent No.: US 6,412,976 B1
(45) Date of Patent: Jul. 2, 2002

(54) WATCH-STRAP INCLUDING MEANS FOR IDENTIFYING IT

(75) Inventors: Jean-Luc Dechery; Didier Salavert, both of Paris; Alain Bonnoit, Gif sur Yvette, all of (FR)

(73) Assignee: Finaluxe, Paris (FR)

( * ) Notice: Subject to any disclaimer, the term of this patent is extended or adjusted under 35 U.S.C. 154(b) by 0 days.

(21) Appl. No.: 09/263,827

(22) Filed: Mar. 8, 1999

(30) Foreign Application Priority Data

Mar. 9, 1998 (FR) ............................................. 98 02839

(51) Int. Cl.⁷ .............................................. G04B 37/00
(52) U.S. Cl. ....................................................... 368/281
(58) Field of Search ........................... 368/10, 281, 282

(56) References Cited

U.S. PATENT DOCUMENTS 4,255,801 A * 3/1981 Ode et al. ..................... 368/10
6,158,854 A * 12/2000 Lebby et al. ................ 368/282

FOREIGN PATENT DOCUMENTS

| EP | 0 337 603 | 10/1989 |
| FR | 2 180 349 | 11/1973 |
| FR | 2 731 531 | 9/1996 |
| JP | 03 197196 | 8/1991 |
| WO | WO 87/03119 | 5/1987 |

* cited by examiner

Primary Examiner—Bernard Roskoski
(74) Attorney, Agent, or Firm—Young & Thompson

(57) ABSTRACT

Watch-strap device adapted to be worn on the wrist includes an electronic tag for identifying the watch-strap. The tag includes an identification circuit and an antenna that are buried in the watch-strap. The circuit is directly adjacent to the connection of the watch-strap to the watch to avoid damage to the circuit caused by flexing of the watch-strap.

13 Claims, 2 Drawing Sheets

FIG_1
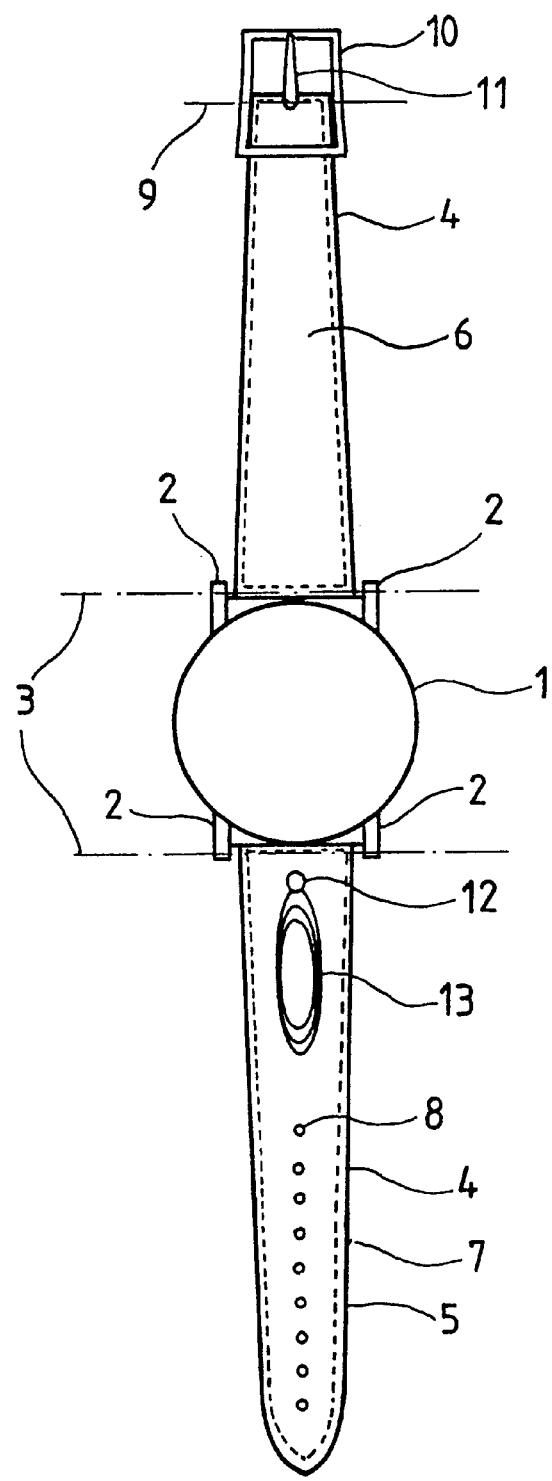

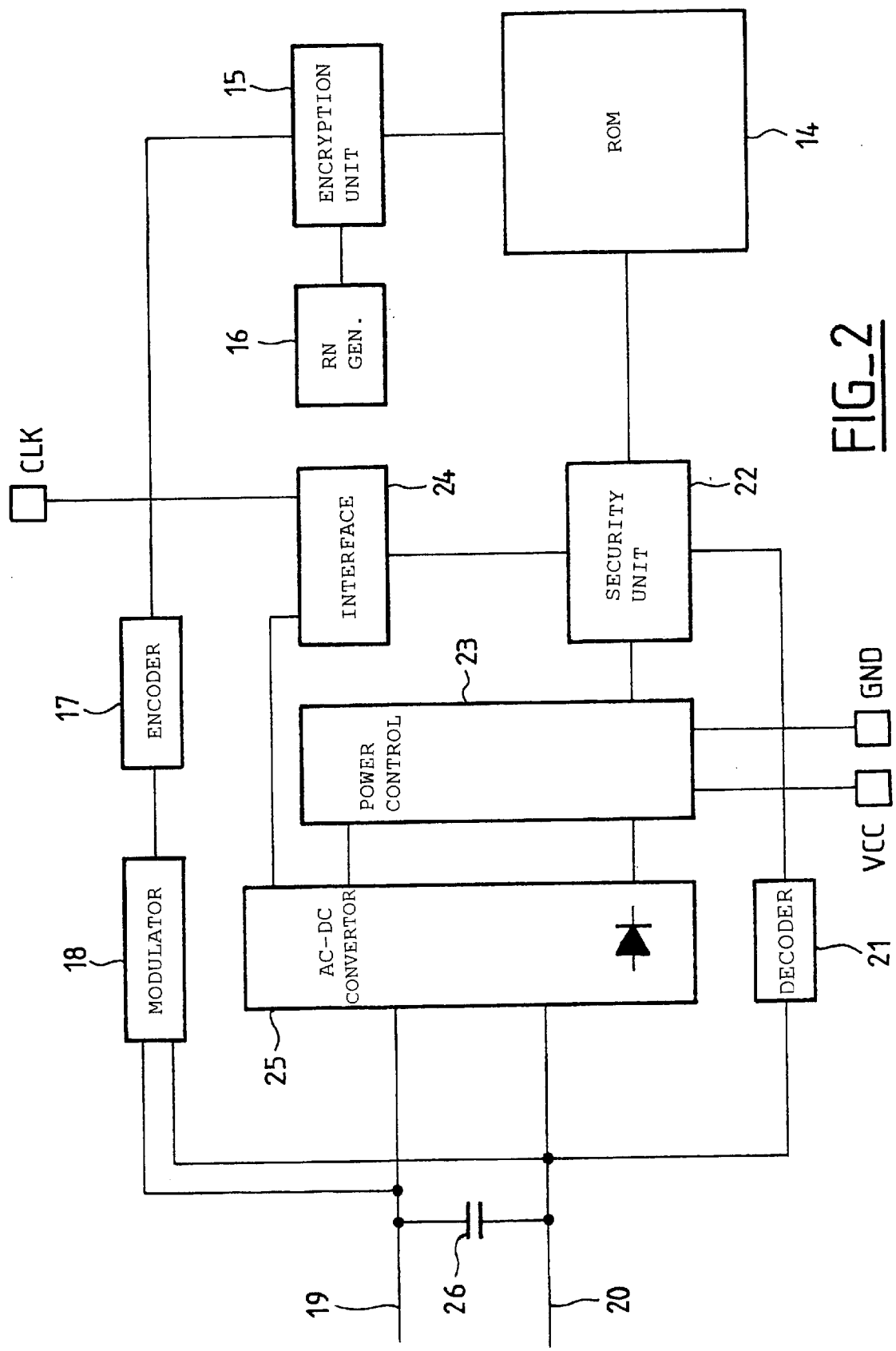
FIG_2

WATCH-STRAP INCLUDING MEANS FOR IDENTIFYING IT

BACKGROUND OF THE INVENTION

The present invention concerns the field of watch-straps, in particular ones made of leather or other materials, and which can be associated with a watch or any other item to be worn on the wrist.

In the field of leather watch-straps, the retailer responsible for replacing a worn out strap with a new strap is faced with the problem of identifying the worn strap in order to replace it with a strap of the same type. Around 60 different leathers and around 100 different colours are routinely used. The retailer therefore encounters problems in identifying the exact design of the watch-strap, especially as its external appearance may have deteriorated due to wear.

Document FR-A-2 731 531 describes a wrist-watch including a unit containing means for receiving and/or transmitting electromagnetic waves containing time information, for example. The receiving and/or transmitting means comprise an antenna formed on an insulative synthetic material support on which is wound an insulated electrically conductive wire. The antenna is placed in the internal opening between the bezel of the watch and the part of the case to which the bezel, the dome and the back are attached. The time shown by the watch can be reset automatically by means of this system. However, a system of the above kind greatly modifies the internal structure of the watch.

A prior art optical identification method uses a colour camera, an image acquisition system and a data processing system to process information to identify the watch-strap. However, wear of the watch-strap can make identifying the type of leather difficult. The identification system would need to be used with great caution because of the optical system.

Also, it is desirable to be able to distinguish watch-straps from the original manufacturer and watch-straps which are copies of the originals.

SUMMARY OF THE INVENTION

An aim of the present invention is to propose a watch-strap that a retailer can recognise easily and which can be differentiated from existing copies on the market.

The watch-strap device in accordance with the invention is adapted to be worn on the wrist. It comprises means for remote identification of said watch-strap including an electronic tag. An electronic tag of the above kind is capable of storing different information such as a serial number of the watch-strap, a watch-strap type identification number, the date of manufacture, etc. Information relating to the watch-strap is to be understood as including information concerning its owner.

In one embodiment of the invention the watch-strap comprises means for fixing it to a housing, for example, of a watch, or to a communication device.

The electronic label can comprise reading means and writing means adapted to modify the information stored in said tag.

In one embodiment of the invention the means for identifying the watch-strap comprise an integrated electronic circuit and an antenna embedded in a portion of the watch-strap. Thus the identification means are discreet and do not degrade the external appearance of the watch-strap. The electronic circuit can be positioned near means for fixing the strap to a housing, for example a watch housing.

The area of the watch-strap near the housing is subject to less torsion stresses because of the presence of the articulation that is generally provided between the watch-strap and the housing. This improves the protection of the electronic circuit.

The antenna comprises a flat and elongate coil of conductive wires. The antenna therefore has the flexibility required to adapt to the shape of the watch-strap. The coil can be disposed between the electronic circuit and attachment means on another part of the watch-strap. The coil and the electronic circuit are disposed in the same part of the watch-strap. The coil can have a length less than or equal to 35 mm and width less than or equal to 3 mm. In the case of a leather watch-strap, a narrow coil of the above kind can be disposed between the two layers of leather forming the watch-strap and between the seams joining said two layers of leather together at the edge, even in narrow watch-straps for women.

In one embodiment of the invention the electronic circuit comprises encryption means, means for converting energy picked up by the antenna to provide the electrical power supply to the circuit, and a non-volatile memory. The watch-strap manufacturer can load the information to be stored by passing the watch-strap at the end of the manufacturing cycle through a device capable, by emitting a magnetic field, of storing information in the memory of the electronic circuit. This step can be entirely automated.

This provides means of identifying a watch-strap associated with a watch, a portable phone, or any other object to be worn on the wrist, without modifying the external appearance of the watch-strap and at very low cost.

The present invention equally consists in a control system comprising a watch-strap device as described hereinabove and means for reading/writing the means for identifying the watch-strap for remote control of a circuit. The watch-strap can therefore be read/written remotely, for example to command an actuator, a contactor or a motor. The circuit advantageously controls means for controlling access to premises, an open or enclosed space, an installation or a vehicle.

The watch-strap can be used for production management, ordering a replacement watch-strap without any possibility of error, easier inventory control, better recognition of the client which can lead to more closely targeted marketing operations, and improved identification of counterfeiting rings and stolen watch-straps. For example, the client can be offered a replacement watch-strap at the end of a particular period of use.

BRIEF DESCRIPTION OF THE DRAWINGS

The present invention will be better understood after studying the detailed description of one embodiment given by way of non-limiting example and illustrated by the accompanying drawings, in which:

FIG. 1 is a diagrammatic view of a watch-strap in accordance with the invention; and FIG. 2 is a diagram of the electronic circuit used.

DESCRIPTION OF THE PREFERRED EMBODIMENTS

FIG. 1 shows that the watch comprises a round housing 1 but this could be any other shape: rectangular, hexagonal, octagonal, etc. Two lugs 2 are provided on each side of the housing 1, each pair of lugs 2 being associated with a pin 3 shown in chain-dotted line.

A watch-strap 4 has a first part 5 and a second part 6. The first part 5 is mounted to pivot above one pin 3 between two lugs 2 and is made of two layers of leather joined together by a seam 7. In FIG. 1 only the top layer of leather is visible. At the end of the first part 5 opposite the housing 1 the leather has a plurality of holes 8 in it aligned in the direction of the length of the first part 5 and adapted to cooperate with the second part 6. Alternatively, a watch-strap in one piece can be used.

The second part 6 is similar to the first part 5 except that its end opposite the watch housing is associated with a pin 9 shown in chain-dotted line. A loop 10 and a spike 11 are associated with the pin 9. The spike 11 is designed to project into one of the holes 8 in the first part 5, the first part 5 being immobilised in the loop 10. The two parts of the watch-strap can equally be attached together by a folding catch.

The first part 5 of the watch-strap 4 is equipped with an electronic microchip 12 disposed between the two layers of leather, substantially halfway across the width of said watch-strap 4 between the seams 7 and near the watch housing 1. The area of the first part 5 near the housing 1 is subject to less deformation than the area away from said housing 1.

The electronic microchip 12 is connected to an antenna in the form of a coil 13 between the two layers of leather, between the two seams 7 and between the electronic microchip 12 and the first of the series of holes 8 in the first part 5. The coil 13 can be made of insulated copper wire with a diameter of 150 $\mu$m, for example. The coil does not extend into the portion of the first part 5 in which the holes 8 are provided because of the risk of cutting a wire when piercing the holes 8. Alternatively, the electronic microchip 12 can be disposed in the second part 6.

FIG. 2 shows that the electronic microchip, which is a microcontroller, for example, includes a read-only memory 14 connected to an encryption unit 15 in turn connected to a random number generator 16 used for encryption, and to an encoder 17. The encoder 17 is connected to a modulator 18 in turn connected to two input wires 19 and 20 of the microchip 12 which are connected to the coil 13 from FIG. 1. The encryption means 15 and 16, the encoder 17 and the modulator 18 constitute means for writing to the read-only memory 14, active when the coil 13 picks up a corresponding electromagnetic signal.

The microchip 12 also includes a decoder 21 connected to the modulator 18, to the input wire 20 and to a security unit 22. The security unit 22 is connected to the read-only memory 14, to a power control unit 23 and to an interface 24. The microchip 12 includes an AC-DC converter 25 connected to the input wires 19 and 20 to convert the alternating current voltage between the wires 19 and 20 into a direct current supply voltage for all the components of the microchip 12. A capacitor 26 between the wires 19 and 20 forms a resonant circuit with the coil 13. The converter 25 is connected to the power control unit 23 from which run a positive voltage line VCC and a ground line GND.

The security unit 22 is connected to the power control unit 23 which regulates the supply voltage. The interface 24 is connected to the converter 25 to generate a clock signal CLK whose frequency depends on that of the received signal.

The electronic microchip therefore provides a power supply to all of the components of the electronic microchip derived from the signal delivered by the antenna consisting of the coil 13, decodes information received via the antenna on receiving the electromagnetic wave for an operation of writing in the memory 14 and encodes information from the memory 14 to be transmitted to a reader during reading of said memory 14.

Accordingly, a retailer having a reader suited to the electronic microchip 12 and in particular comprising an antenna can read information in the memory 14, the watch-strap being placed at a distance of a few centimetres from the reader. The information can be transferred using appropriate encoding to a microcomputer on which the features of the watch-strap to be ordered can be displayed. This information can be transferred to the watch-strap manufacturer who can deliver quickly. The encryption means 15, 16 guarantee that writing the memory 14 is authorised only if a code is known. The watch-strap manufacturer can therefore keep this code secret and authorise only a retailer to read the memory 14. The reader used by the retailer is then simplified in that it is provided only with reading means. The reader must transmit a relatively powerful signal to power the microchip 12 and enable reading of the memory 14.

The antenna 13 operates at a frequency in the order of 13.6 MHz to enable the use of a small antenna. An antenna can be used having six turns and an inductance of 1.5 $\mu$H. 150 $\mu$m diameter copper wire is preferably used. However, a wire having a diameter in the range 100 $\mu$m to 200 $\mu$m can be used without increasing the thickness of the antenna and of the microchip beyond 0.5 $\mu$m. The inductance of the antenna is naturally matched to the input capacitance of the analog stage of the integrated circuit.

The signal carrier frequency can also be increased to reduce the area of the antenna. If the frequency of the signal is multiplied by N, the area of the antenna can be reduced by approximately the same ratio. To retain passive integrated circuits operating at 13.6 MHz the analog part of the integrated circuit could be modified to increase the frequency of the signal.

The invention provides a watch-strap which has means for identifying it invisible to the naked eye, resistant to deformation, longitudinal twisting and lateral twisting of the watch-strap, and protected against impact or external mechanical attack. A connection is naturally provided between the antenna and the electronic microchip which is resistant to the glues usually employed in watch-straps.

The electronic microchip can store information relating to the supplier, the model, the material and the colour, the length of the first and second parts of the watch-strap, the assembly, the loop, the size, the lining of the watch-strap, the colour of the stitching thread, the finish, the month and year of manufacture, and an individual identification number that identifies the client. The watch-strap can be in one or two parts, made of leather, metal or other materials. A watch-strap of the above kind has considerable advantages in terms of inventory control, both for the retailer and for the manufacturer or wholesaler of watch-straps, watches or other devices including the watch-straps. It facilitates customer tracking, the fight against counterfeit copies and the fight against theft. It also offers a guarantee to the client that a replacement watch-strap will be the same as the original watch-strap.

What is claimed is:

1. Watch-strap adapted to be worn on the wrist, comprising:
    means for identifying said watch-strap remotely including an electronic tag storing information about the watch-strap and an antenna that are buried in a portion of the watch-strap strap, the electronic tag comprising means for converting energy recovered by the antenna to provide the electrical power supply of the circuit; and
    means for fixing the watch-strap to a watch housing.
2. Device according to claim 1 wherein the electronic tag comprises reading means and writing means.

3. Device according to claim 1 wherein the means for identifying the watch-strap comprise an integrated electronic circuit embedded in a portion of the watch-strap.

4. Device according to claim 3, wherein the electronic circuit is near the means for fixing the watch-strap to a housing.

5. Device according to claim 3 wherein the antenna comprises a flat elongate coil of conductive wire.

6. Device according to claim 5 wherein the coil is between the electronic circuit and attachment means on another part of the watch-strap.

7. Device according to claim 5 wherein the coil has a maximum length of 35 mm and a maximum width of 3 mm.

8. Device according to claim 1 wherein the electronic circuit includes encryption means and a non-volatile memory.

9. Control system comprising a device according to claim 1 and means for reading/writing the identification means of the watch-strap for remote control of a circuit.

10. System according to claim 9 wherein the circuit comprises an actuator, a contactor or a motor.

11. System according to claim 9 wherein the circuit controls means controlling access to premises, an open or closed space, an installation or a vehicle.

12. Device according to claim 3, wherein said circuit is directly adjacent to said means for fixing and is between said means for fixing and said antenna.

13. A wristwatch comprising:

a watch and a wrist band separate from said watch, said watch and said wrist band each comprising complementary means for attachment of said wrist band to said watch, said wrist band further comprising an electronic information storage and retrieval circuit and an antenna connected to said circuit, both said circuit and said antenna being embedded entirely within said wrist band, said circuit being directly adjacent to said means for attachment between said means for attachment and said antenna, said circuit including a converter for recovering energy received by said antenna and a memory storing information about the wrist band.

* * * * *